United States Patent
Chauhan et al.

(10) Patent No.: US 11,430,020 B1
(45) Date of Patent: Aug. 30, 2022

(54) TECHNIQUES FOR DETERMINING AN ITEM CONDITION METRIC

(71) Applicant: Amazon Technologies, Inc., Seattle, WA (US)

(72) Inventors: Ashish Chauhan, Seattle, WA (US); Salil Joshi, Fremont, CA (US); John Martin Miller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 16/712,185

(22) Filed: Dec. 12, 2019

(51) Int. Cl.
*G06Q 30/02* (2012.01)
*G05B 19/4155* (2006.01)

(52) U.S. Cl.
CPC ..... *G06Q 30/0278* (2013.01); *G05B 19/4155* (2013.01); *G05B 2219/45066* (2013.01)

(58) Field of Classification Search
CPC .............. G06Q 30/0278; G06Q 30/02; G06Q 30/0631; G05B 19/4155; G05B 2219/45066
USPC ......................................................... 705/306
See application file for complete search history.

(56) References Cited

U.S. PATENT DOCUMENTS

| | | | | |
|---|---|---|---|---|
| 7,596,512 | B1* | 9/2009 | Raines ................... | G06Q 30/02 705/26.4 |
| 8,595,079 | B1* | 11/2013 | Raines ............... | G06Q 30/0278 705/26.1 |
| 9,699,490 | B1* | 7/2017 | Japp ..................... | H04N 21/251 |
| 10,580,054 | B2* | 3/2020 | Cain .................. | G06Q 30/0623 |
| 10,733,656 | B1* | 8/2020 | Price .................. | G06Q 30/0627 |
| 10,762,572 | B1* | 9/2020 | Hopkins ................ | G06K 9/325 |
| 2005/0267633 | A1* | 12/2005 | Waita ..................... | G06Q 30/06 700/245 |
| 2009/0138290 | A1* | 5/2009 | Holden ................ | G06Q 10/087 705/4 |
| 2011/0264595 | A1* | 10/2011 | Anspach ............ | G06Q 30/0629 705/306 |

(Continued)

FOREIGN PATENT DOCUMENTS

| | | | |
|---|---|---|---|
| ES | 2293847 B2 * | 7/2009 | |
| WO | WO-0171458 A2 * | 9/2001 | ............. G06Q 30/06 |

OTHER PUBLICATIONS

Pudaruth, Sameerchand. "Predicting the price of used cars using machine learning techniques." Int. J. Inf. Comput. Technol 4.7 (2014): 753-764. (Year: 2014).*

*Primary Examiner* — Sarah M Monfeldt
*Assistant Examiner* — John S. Wasaff
(74) *Attorney, Agent, or Firm* — Kilpatrick Townsend & Stockton LLP

(57) ABSTRACT

Techniques for determining a metric for an item that represents a condition of the item are described herein. For example, a request for a metric determination for an item may be received where the request is associated with a user identifier. Browsing history information and purchase history information from a website may be obtained based at least in part on the user identifier. The browsing history information and the purchase history information may be filtered to obtain a data set based at least in part on a plurality of item categories associated with items included in the browsing history information and the purchase history information. A metric for the item may be determined based at least in part on the data set and a base metric for the item.

16 Claims, 10 Drawing Sheets

(56) References Cited

U.S. PATENT DOCUMENTS

| | | | | |
|---|---|---|---|---|
| 2011/0313936 A1* | 12/2011 | Sieger | ............... | G06Q 10/083 |
| | | | | 705/306 |
| 2011/0320254 A1* | 12/2011 | Borenstein | ......... | G06Q 30/0224 |
| | | | | 705/14.25 |
| 2012/0284145 A1* | 11/2012 | Kalin | ............... | G06Q 30/0631 |
| | | | | 705/26.7 |
| 2013/0329943 A1* | 12/2013 | Christopulos | ...... | G06K 9/00671 |
| | | | | 382/103 |
| 2014/0058956 A1* | 2/2014 | Raines | ............... | G06Q 30/0201 |
| | | | | 705/306 |
| 2014/0143095 A1* | 5/2014 | McCluskey | ........ | G06Q 30/0605 |
| | | | | 705/26.63 |
| 2014/0258044 A1* | 9/2014 | Chrzan | ............. | G06Q 30/0205 |
| | | | | 705/26.64 |
| 2014/0279263 A1* | 9/2014 | Liu | ................... | G06Q 30/0627 |
| | | | | 705/26.63 |
| 2016/0078403 A1* | 3/2016 | Sethi | ................... | G06F 16/9535 |
| | | | | 705/26.81 |
| 2017/0098197 A1* | 4/2017 | Yu | ......................... | G06Q 30/02 |
| 2017/0300991 A1* | 10/2017 | Aggarwal | .......... | G06Q 30/0283 |
| 2018/0300815 A1* | 10/2018 | Collins | .............. | G06Q 30/0278 |
| 2019/0095963 A1* | 3/2019 | Martin | .................. | G06Q 10/20 |
| 2019/0279263 A1* | 9/2019 | Tang | .................... | G06N 3/0454 |
| 2020/0322546 A1* | 10/2020 | Carolus | ............... | H04N 5/2254 |

\* cited by examiner

TECHNIQUES FOR DETERMINING AN ITEM CONDITION METRIC

BACKGROUND

Conventional valuation systems for items such as homes or art are generally based on demand in secondary markets that are further guided by an assessment system that is subjective and limited to certain experts. For example, an experienced mechanic may provide car valuations or an experienced assessor may provide valuations for a home or a piece of art. However, conventional assessment systems fail to obtain or analyze information which indicates the care and condition of an item throughout its lifetime. Instead, the systems are focused on particular subjective criteria and the demand for the item on re-sale markets. In addition, users who seek to sell items may be incentivized to hide or not reveal all the information about an item to skew the evaluation or assessment of the item.

BRIEF DESCRIPTION OF THE DRAWINGS

Various embodiments in accordance with the present disclosure will be described with reference to the drawings, in which.

DETAILED DESCRIPTION

Figure 1:
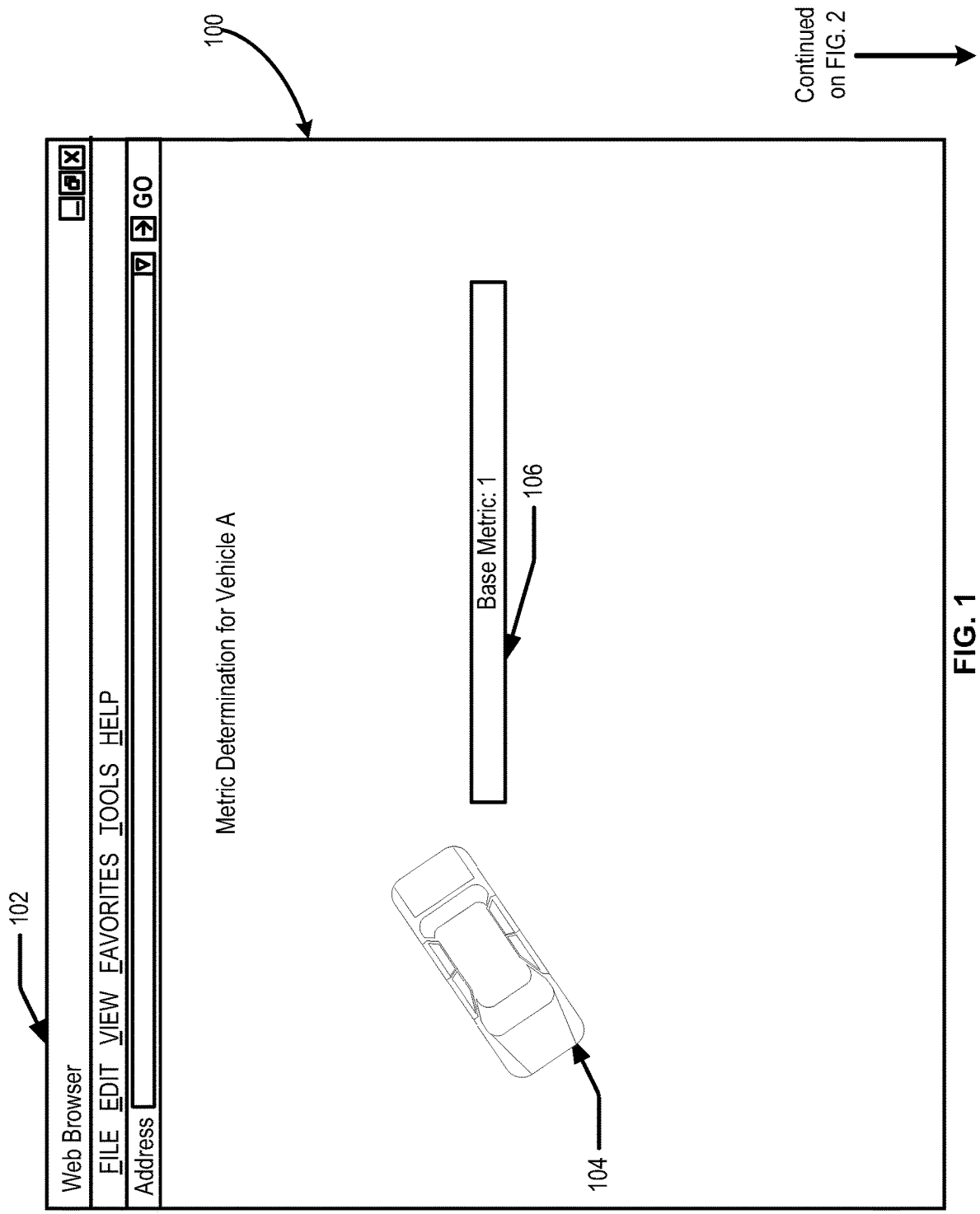
FIG. 1 illustrates an example user interface for a metric determination feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a metric determination feature for predicting a condition of an item. The metric determination feature may be implemented by one or more service provider computers that utilize information from a website or online retailer associated with a user to generate a metric for an item that is being assessed or evaluated. In accordance with at least one embodiment, the metric may represent a value or condition of the item which may be utilized when offering the item for sale (e.g., reselling the item) or transferring the item to another user. In embodiments, the service provider computers may utilize the information associated with a user and the website or online retailer to depreciate a base metric or value for an item. For example, a base metric for a brand new computer may be a "one", representing the highest valuation metric for the item. The metric determination feature implemented by the service provider computers may utilize information from a website or online retailer associated with a user who is trying to sell the same computer to depreciate the metric and predict the condition of the item using said information. In embodiments, the base metric may be updated and provided to a user who may utilize the updated base metric as a guideline when selling or transferring the item to another user. In accordance with at least one embodiment, the updated base metric for an item may be further modified based on additional information provided by the user or by a third party with the user's consent. For example, the user may transmit images of the item which can be analyzed by the service provider computer to modify the updated base metric to reflect better or worse maintenance of the item by the user over the duration of their ownership.

An illustrative example of a metric determination feature for an item such as a car may be considered. For example, a user may wish to sell their car (e.g., via an online retailer). The user may want to determine how much money they could receive for their car in its current condition or usage. The user may interact with a user interface provided by the service provider computers to submit a metric determination request for the car. The service provider computers may obtain information associated with the user including their browsing history and purchase history with a website or online retailer. In embodiments, the service provider computers may obtain information about the user and item such as the user's geographic location and the item's geographic location. The service provider computers may obtain a base metric for the car that represents an excellent condition or brand new car of the same type. In embodiments, the service provider computers may update the base metric based at least in part on the obtained information associated with the user's activity on the website or online retailer. For example, the browsing history and purchase history may indicate that the user has purchased a new battery for the car during their ownership of the car as well as two tire replacement services. The service provider computers may update the user interface to present a representation of the car as well as the updated base metric which reflects the value of the car. For example, the metric determination feature implemented by the service provider computers may determine that the updated base metric for the particular car is a "three" out of "five" where "one" represents the best condition and "five" represents the worst condition of an item. The user interface may also present one or more options for the user to provide additional information that can be utilized by the service provider computers to modify the updated base metric. For example, the user may answer a maintenance care wizard questionnaire or provide images or video of the car which may modify the updated base metric for the item.

In embodiments, the service provider computers implementing the metric determination feature may receive or obtain a request for a metric determination for an item offered by a website. In accordance with at least one embodiment, the request for a metric determination may be for an item that is not offered by a website associated with the service provider computers. In embodiments, the service provider computers may obtain browsing history information and/or the purchase history information from a third party website or application. The request for a metric determination may include a request to determine a value or condition of an item that can be utilized when offering to sell or trade. In embodiments, the metric may be associated with or indicate a monetary value for an item based on the determined or predicted item's condition. In accordance with at least one embodiment, the service provider computers may train and implement a machine learning algorithm that utilizes browsing history information and purchase history information, as well as other information, to determine a metric or update the base metric for an item. The machine learning algorithm may be a supervised machine learning algorithm that is utilized to generate the metric that represents the predicted condition or value of an item given information about the item or related items as described herein. The browsing history information may include information about items, services, or other information browsed by a user as they interact with the website or online retailer. For example, browsing history information may include information about an item that a user viewed an image for, read a description for, read reviews for, but did not purchase. Purchase history information may include information about purchase of items or services of a user from a website or online retailer. Purchase history information and browsing history information can include items or services from a different item category than the item category associated with the item of the request for the metric determination. For example, browsing of a dog car seat cover may be analyzed by the service provider computers when evaluating the potential condition of a vehicle. The purchasing behavior and browsing behavior from other item categories than the item category associated with the request for the metric determination may be a good indicator and data point utilized by the machine learning algorithm and/or service provider computers regarding the condition and care of a particular item.

In accordance with at least one embodiment, the machine learning algorithm implemented by the service provider computers can determine an initial metric based on the browsing history information and purchase history information associated with a user and a website or online store. The metric may be used to depreciate or update the base metric for the item such that a user would receive a recommended value or condition of the item based on their care and maintenance of the item. In embodiments, the service provider computers may receive additional information about the item, either from the user or a third party, to modify the updated base metric as the machine learning algorithm can be configured to utilize multiple data sets and parameters to update the metric for the item. For example, users my upload media such as images and video of the item which can be compared to calibrated images of the item to aid in determining the condition of the item. In embodiments, the service provider computers may implement one or more image recognition algorithms or other image analysis algorithms for comparing media received about an item to other media about the item for use in updating the determined condition or value of the item. In accordance with at least one embodiment, the service provider computers implementing the machine learning algorithm can utilize other information from the user such as answers to a maintenance wizard questionnaire or information provided by a third party such as a professional evaluator or assessor to update the determined metric or modify the updated base metric for an item.

Information from third parties may be requested or received based on the user's consent to access such information regarding their care and maintenance of an item such as insurance information for a vehicle. Once the base metric has been updated or modified the service provider computers may update a user interface to present a representation of the item, such as a vehicle, with the updated base metric adjacent or proximal to the representation of the item. In embodiments, the user interface may be updated to highlight or call out attention to certain portions of the item to a user interacting with the user interface. The highlighted or attention promoting areas may be associated with text, images, hyperlinks, or other media which indicates particular browsing history information or purchase history information that was of particular relevance to the determination of the metric or updated base metric for the item. For example, a vehicle tire may be associated with information which informs the user, via the user interface, that the user purchased the new tire several months prior to the request for the metric determination for the vehicle. The service provider computers may generate and transmit instructions for capturing certain angles or portions of the item for use in comparing to calibrated images to aid in determining the condition or value of the item. The service provider computers may update the machine learning algorithm based on feedback information received from users. For example, the service provider computer may have determined that the updated base metric for an item is a three. However, when the user went to sell the item, the item sold at an updated base metric of two. The metrics may be associated with monetary values such that the user received more money when selling the item than predicted given the specific set of information analyzed by the machine learning algorithm and service provider computers. In response to the feedback information the algorithm may be updated such that the specific set of data may result in a different updated base metric for subsequent item analysis.

The techniques described herein are an improvement on conventional item evaluation methods. For example, conventional methods for determining a resale value, assessment, or evaluation include manual analysis that may be biased. Further, the analysis performed by professional evaluators or resellers often utilizes factors and parameters that are not visible to the item seller. Conventional evaluation techniques may utilize subjective analysis without considering the actual condition or maintenance of care of the item. In addition, conventional systems may be limited to the information that is provided by users to properly analyze an item and some users may be incentivized to not share information so as to artificially modify the analysis in their own favor. Users may also have forgotten information about an item over a period of time. Conventional systems may be unable to track the history of an item such as across multiple owners or across geographies, such as whether an item was in a flood-prone area. The methods and systems described herein provide for more efficient evaluation determination by not relying exclusively on manual analysis techniques. Moreover, the methods and systems described herein for the metric determination feature may utilize information from a user's activity on a website or online retailer to determine an updated base metric for an item that the user can't lie about or without to affect the outcome of the evaluation. Other advantages to efficiency and accuracy of the prediction of the value of an item for resale can be gained by the metric determination features described herein as the system learns and adapts as more information is shared or obtained (e.g., user's sharing media of the item they intend to sell). The adaptive nature of the metric determination feature will result in more accurate results as the machine learning algorithm is trained and updated with information, feedback information, and analysis opportunities.

FIG. 1 illustrates an example user interface for a metric determination feature, in accordance with at least one embodiment. FIG. 1 depicts user interface 100 presented via a web browser 102. Though FIGS. 1-5 may depict user interfaces presented via a web browser it should be understood that the user interfaces may be presented via native or third party applications of a device. The user interface 100 of FIG. 1 depicts a representation of an item (vehicle 104) as well as a base metric 106 for the vehicle 104. As used herein, a base metric may represent a value or condition of an item at a new state or a brand new item price or value. In embodiments, the service provider computers implementing the metric determination feature may utilize a metric system where one represents a brand new item and a metric of five represents the worst condition of the item. In embodiments, each metric may be associated with a monetary value. In embodiments, the metric may be associated with a relative value that reflects the condition of the item over the lifetime of the item and the maintenance and care associated with the item. In accordance with at least one embodiment, a metric may be mapped or refer to a table of monetary values, that is dynamically updated, to reflect current economic values and trends for the item such as vehicle 104. It should be noted that in the example item, vehicle 104, and the vehicle described in FIGS. 1-5, the metric may be associated with a depreciation of the item that the metric determination feature described herein may be used to predict a value for an item, such as art, that appreciates over time rather than depreciates. To continue the example, the base metric 106 for the vehicle 104 may represent the value that the vehicle 104 should sell for at a brand new state or condition of the vehicle 104.

In accordance with at least one embodiment, users may interact with user interface 100 to provide information about an item that they wish to determine a metric for or updated base metric. For example, in the case of the vehicle 104, a user may provide the make, mode, and year of the vehicle to initiate a request for a metric determination. Users may interact with the user interface 100 provided by the service provider computers to transmit a request for a metric determination for an item such as is vehicle 104. In embodiments, the request may include information about the user such as a user identifier or device identifier that can be used to uniquely identify their interactions and behavior with a website or online retailer. For example, a user may perform a login procedure while interacting with user interface 100 to provide a user identifier or user name in order to submit the request for the metric determination of vehicle 104. In accordance with at least one embodiment, the service provider computers implementing the metric determination feature and user interface 100 may determine the base metric for the item (e.g., vehicle 104) based at least in part on values or metrics utilized in an associated website or online retailer to sell the same item. The values and metrics may be from offline retailers as well. In embodiments, the service provider computers may also request or otherwise obtain base metrics for items from one or more external sources such as third party computers that also sell or provide similar items such as vehicle 104. The service provider computers may determine an updated base metric for the vehicle 104 based on information associated with the user and their interactions (e.g., browsing or purchase activity) on an associated website or online retailer as described in more detail in FIG. 2 below.

Figure 2:
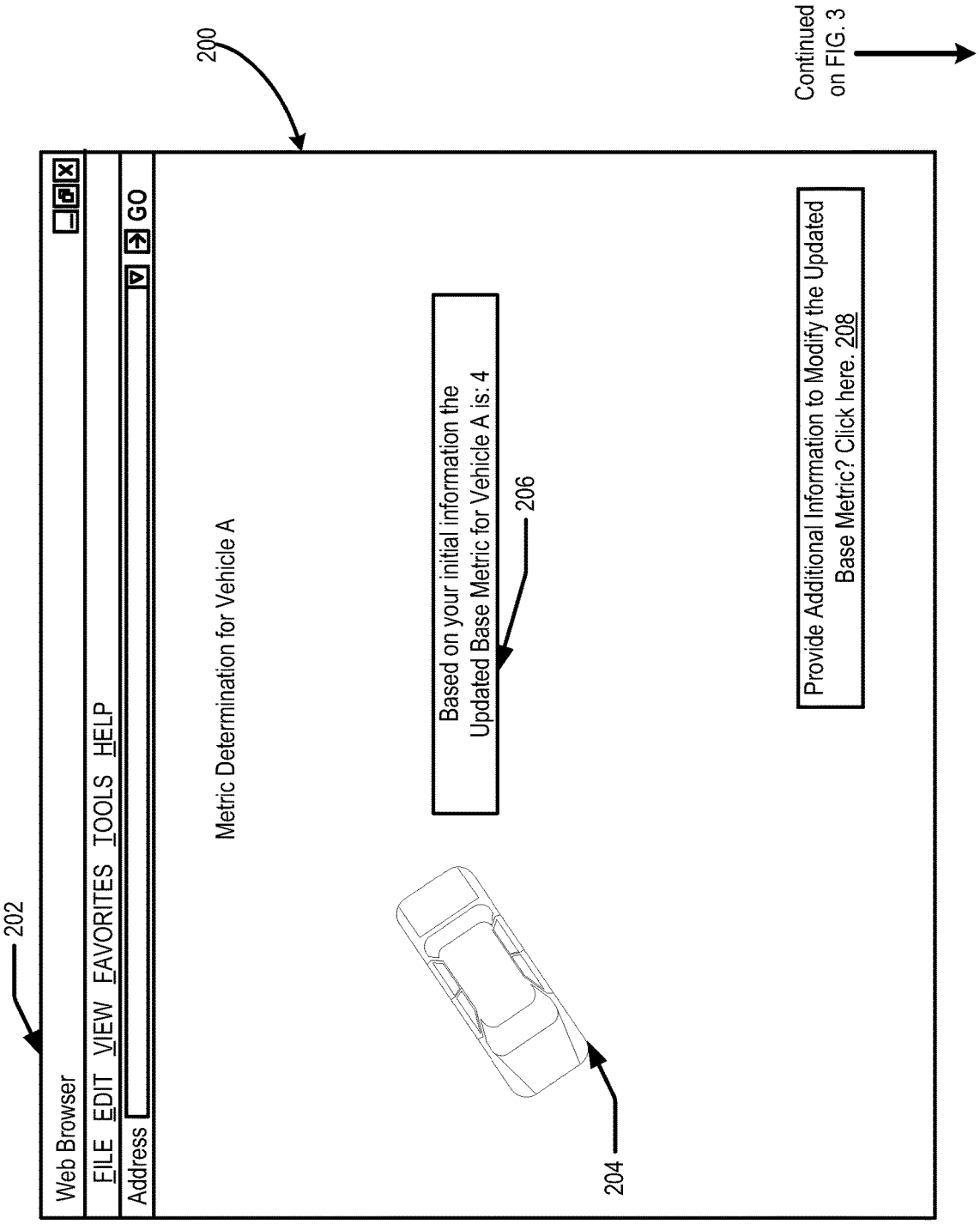
FIG. 2 illustrates an example user interface for a metric determination feature, in accordance with at least one embodiment.

FIG. 2 illustrates an example user interface for a metric determination feature, in accordance with at least one embodiment. FIG. 2 depicts user interface 200 presented via web browser 202. The user interface 200 and web browser 202 and other features depicted in FIG. 2 may be a continuation of features and elements described in FIG. 1. In FIG. 2, a representation of vehicle 204 is depicted in user interface 200 where vehicle 204 may be the same vehicle as 104 of FIG. 1. The user interface 200 depicts an update to the user interface 100 as the service provider computers implementing the metric determination feature update the base metric 206 of the vehicle 204 to update from the initial base metric 106 of FIG. 1 using the customized information obtained about the user (e.g., browsing history information and purchase history information). As is illustrated in FIG. 2, the initial base metric for the vehicle 104 has been updated to updated base metric 206 of "four" from "one" for vehicle 204 indicating a worse condition or potential resale value for the particular item (vehicle 104/204) given the indicated care and maintenance provided by the user for the item as determined by their browsing history information and purchase history information.

In accordance with at least one embodiment, the user interface 200 also includes feature 208 which provides the user an opportunity to provide additional information which may further modify the updated base metric 206. The provision of additional information is described with reference to FIG. 3 below. In embodiments, the service provider computer implementing the metric determination feature may be configured to implement and utilize a machine learning algorithm that is trained to analyze data sets including the purchase history information and the browsing history information of a user associated with item 204 in a corresponding website or online retailer to determine the updated base metric 206. For example, the user associated with the request for the metric determination for vehicle 204 may have browsed or navigated to web page(s) for hub cab replacements, purchase new windshield wipers, and child car seats. The user may have also purchased several engine repair services for the vehicle 204 as indicated by the user's browsing history information and purchase history information.

The machine learning algorithm implemented by the service provider computers may filter the browsing history information and purchase history information based on item categories associated with the items included in the browsing history information and the purchase history information and the item category associated with the item of the request for the metric determination (vehicle 204). The machine learning algorithm may be configured to determine relative weights for the data included in the filtered purchase history information and browsing history information. For example, data points or sets of item purchases or browses may be weighted differently for items of similar items to the vehicle 204 or based on the duration of time between the browse or purchase compared to the time period of the request for the metric determination (e.g., items purchased further in the past might be weighted differently than items purchased more recent to the request for the metric determination). In embodiments, the browsing history information and purchase history information may include services navigated to, browsed, researched, or purchased from the website or online retailer associated with the service provider computers and user interface 200.

Determining the relative weights to associate with the data points or data sets included in the purchase history information and browsing history information may be based at least in part on one or more maintenance thresholds associated with an item type, an item category, or a specific item. The maintenance thresholds may vary based on the item type or item category and may be specified by the service provider computer or obtained from one or more third parties. In embodiments, the service provider computers may determine a geographic area to associate with the user identifier based on the items or services purchased or browsed. The service provider computers may be configured to determine a range of values or metrics for the vehicle 204 based on the determined geographic area of the user which may aid the user in identifying an appropriate monetary value to utilize when attempting to resell the vehicle 204. In embodiments, the updated base metric 206 may be further modified to reflect the range of values or metrics as indicated by the geographic area of the user associated with the request for the metric determination of user interface 200. FIG. 2 also includes a feature, data object, or user interface element 208 which enables a user to provide additional information which may further modify the updated base metric 206 as described with more reference in FIG. 3 and herein.

Figure 3:
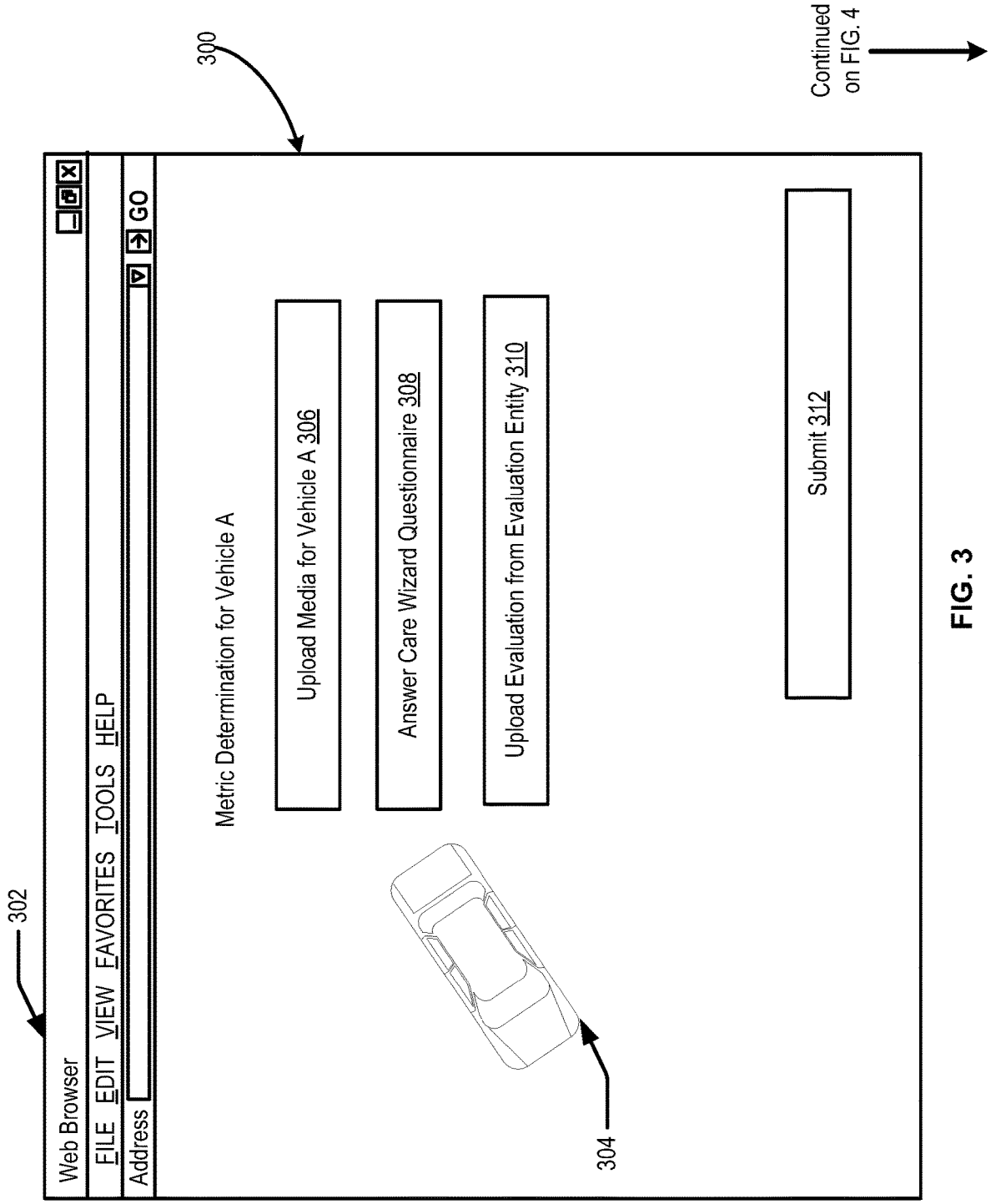
FIG. 3 illustrates an example user interface for a metric determination feature, in accordance with at least one embodiment.

FIG. 3 illustrates an example user interface for a metric determination feature, in accordance with at least one embodiment. FIG. 3 includes user interface 300 presented via web browser 302. The features and elements of FIG. 3 may be a continuing process for determining an updated base metric for the vehicle 104 such that the vehicle 304 is the same vehicle 104, the user interface 300 is an updated user interface 200, and the web browser 302 is the same web browser 202 continuing from FIG. 2. For example, a user may have interacted with the data object 208 to provide additional information to modify the updated base metric 206 of FIG. 2 for vehicle 204/304. The user interface of FIG. 3 includes several features or data objects for providing additional information which may be utilized by the service provider computer implementing the metric determination feature for modifying the updated base metric 206. As depicted in FIG. 3, a user may upload media for an item 306 such as for vehicle 304, answer a care wizard questionnaire 308, or upload an evaluation from an evaluation entity 310. Once the user has uploaded, provided, or otherwise transmitted the additional information (306-310), the user may submit 312 the additional information (306-310) for further analysis and modification of the updated base metric 206 for vehicle 304. In embodiments, the service provider computers implementing the metric determination feature may maintain and update calibrated media which includes one or more images or video from one or more reference points of view for use in determining the condition of a given item such as vehicle 304. For example, a calibrated image of an engine for the same type of vehicle as vehicle 304 may be compared to an uploaded image from a user of the engine for their vehicle (e.g., vehicle 304) to aid in determining the condition of the vehicle 304.

In embodiments, a user may upload media for an item 306 such as images or video captured by a user device, a computer device, a camera device, or any suitable media capturing device. In embodiments, the service provider computers may implement one or more image recognition algorithms that compare the media provided by the user for item 304 and one or more images of a similar item (e.g., the same vehicle as vehicle 304) to identify flaws or maintenance performed on the item during ownership by the user. In accordance with at least one embodiment, the service provider computer may update the user interface 300 or provide instructions to a user device associated with the user for capturing certain angles and portions of the item (e.g., vehicle 304) for performing the analysis of the images of the item. The angles and portions indicated in the instructions may be modified based on the type of item. For example, the instructions may indicate that a user should capture a picture of the car engine for vehicle 304 in certain lighting conditions but may only indicate that a top down view and side view be captured for shoes that a user is interested in determining an updated base metric. Item categories may also be utilized to determine certain angles and portions of the items which may be captured or instructed to be captured in the uploaded media 306 for the item or vehicle 304.

A user may also interact with user interface 300 to provide answers related to a care wizard questionnaire 308 for vehicle 304. In embodiments, the service provider computers may generate and present different care wizard questionnaires depending on the type of item associated with the request for the metric determination. For example, for vehicle 304 the care wizard questionnaire 308 may include directed questions towards dates and mileage for oil changes, if accidents have occurred, which parts of the care were or are damaged, number of tire rotations per life time, etc. In embodiments, the service provider computers may generate the care wizard questionnaire 308 or may obtain questions based on maintenance guidelines provided by third party for the particular item (e.g., vehicle 304). A user may interact with user interface 300 to provide, upload, or otherwise transmit an evaluation from an evaluation entity at 310 for vehicle 304. In embodiments, an evaluation entity may be a professional assessor or valuator for an item of the item type in question for the request for metric determination. For example, for vehicle 304 an evaluation entity may be a mechanic. In accordance with at least one embodiment, the service provider computers may also request information from third parties such as evaluation entities on behalf of the user and with the consent of the user. The information requested by the service provider computers from third parties may include insurance information, previous sale or ownership information, or other associated information that corresponds to the condition of the item. For example, a third party may provide a metric or value (evaluation metric) that represents their own individual analysis (evaluation information) of vehicle 304 to determine their own updated base metric. The additional information (306-310) and the information from third parties may be utilized by the machine learning algorithm implemented by the service provider computers to modify the updated base metric for the vehicle 304 as illustrated and described in FIG. 4.

Figure 4:
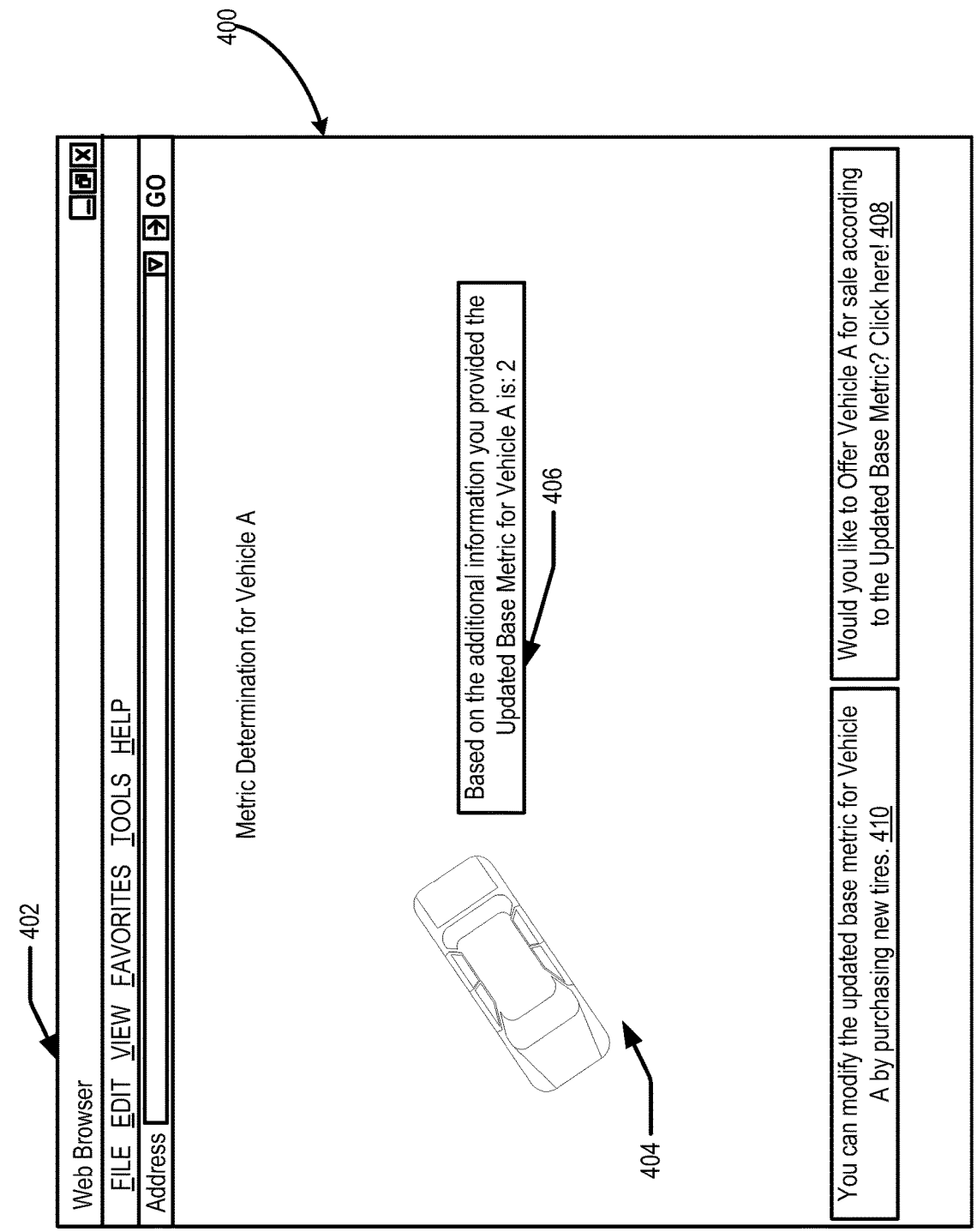
FIG. 4 illustrates an example user interface for a metric determination feature, in accordance with at least one embodiment.

FIG. 4 illustrates an example user interface for a metric determination feature, in accordance with at least one embodiment. FIG. 4 includes user interface 400 presented via web browser 402. The features and elements of FIG. 4 may be a continuing process for determining an updated base metric for the vehicle 104 such that the vehicle 404 is the same vehicle 104, the user interface 400 is an updated user interface 300, and the web browser 402 is the same web browser 302 continuing from FIG. 3. For example, a user may have interacted with user interface 300 to provide additional information 306-310 which caused the user interface 400 to update and present a modified updated base metric 406 for the vehicle 404. As illustrated in FIG. 4, the modified updated base metric for the vehicle 404 is now two as opposed to four based on the additional information provided by the user regarding the vehicle 404. The change in the metric for the vehicle 404 may reflect a more accurate prediction of the resale value or condition of vehicle 404 by having access to more information about the care and maintenance for vehicle 404 by the user.

The user interface of FIG. 4 includes a feature or data object 408 for offering or listing the item (e.g., vehicle 404) for sale, barter, or transfer to another user or entity via an online retailer or website associated with the service provider computers that implement the user interface 400. By utilizing the feature 408 a user may offer the vehicle 404 for a price that corresponds to the modified updated base metric 406. For example, for vehicle 404 a modified updated base metric of two may correspond to $20,000. If on the open retailer the user receives an amount of money or trade that exceeds the predicted value for the vehicle 404, the user may provide feedback information to the service provider computers in the form of the actual retail amount or corresponding metric (e.g., 1 or 3). In embodiments, the service provider computers may be configured to update the machine learning algorithm with the feedback information for use in analyzing and determining updated base metrics for subsequent similar items with similar parameters or information (browsing history information, purchase history information, and/or additional information about the item). FIG. 4 also includes a data object or feature 410 that includes information for a user to modify the updated base metric for an item. For example, the data object or feature 410 informs a user that they may modify the updated base metric for vehicle 404 by purchasing new tires for the vehicle. In embodiments, the service provider computers may generate one or more recommendations for modifying the updated base metric for an item submitted with the metric determination feature based on a number of data points. For example, a user could provide additional information about themselves such as income, geographic area, previous geographic areas that the user has lived. The service provider computers implementing the metric determination feature may utilize other data points, such as other purchases, browsing history, or services obtained by other users for similar items that resulted in better metric scores to generate the recommendation that is used to generate the data object or feature 410. For example, a user of the same type of car (e.g., "Vehicle A") may have had a better metric score for their car by purchasing certain items or services, such as regular tire rotation services. In embodiments, the specific data points in the purchase history information and browsing history information may be weighted differently such that the more heavily weighted, and therefore more important, purchases or browsing of items or services are more likely to be recommended to a user for modifying the updated base metric for an item.

Figure 5:
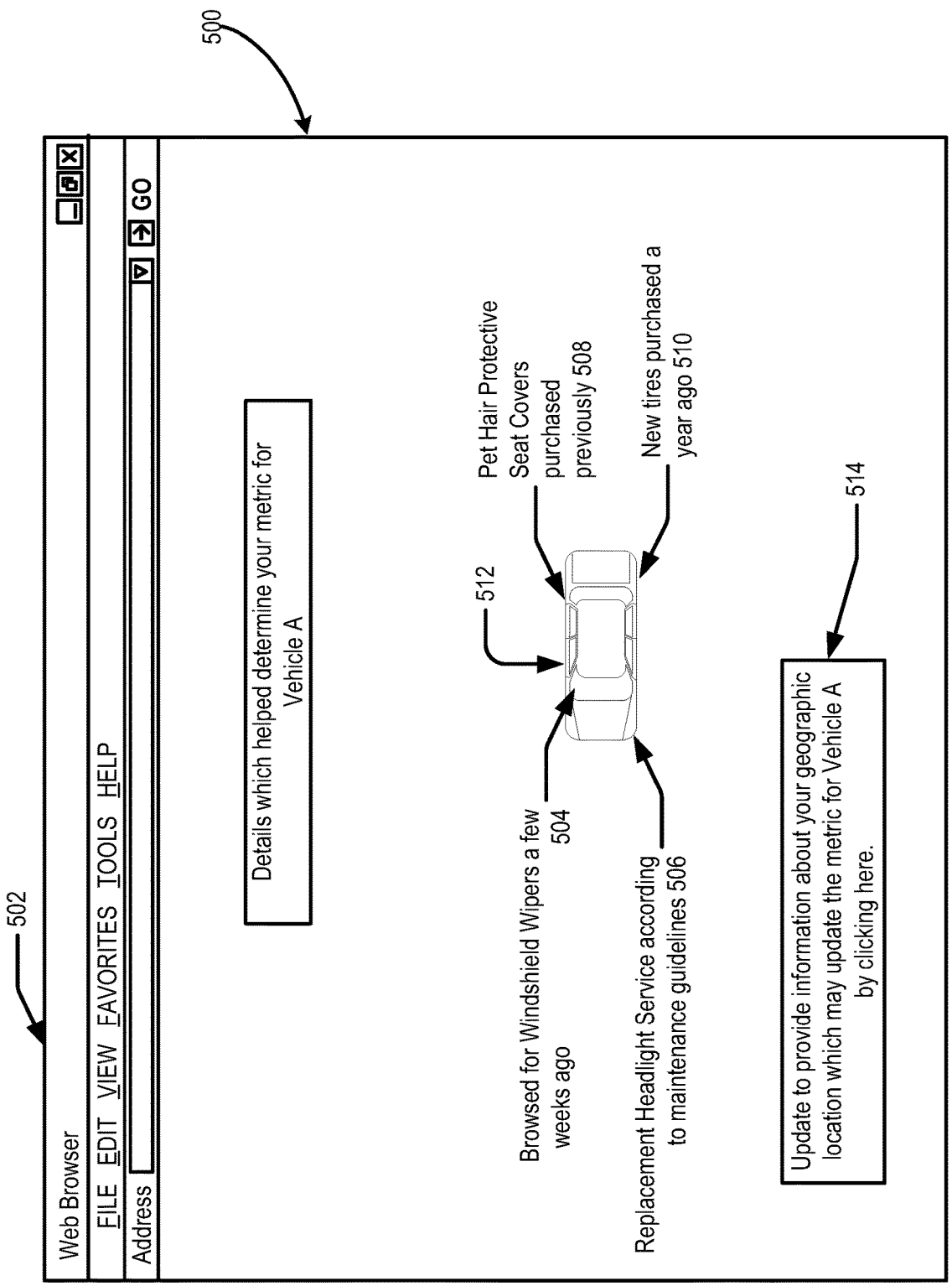
FIG. 5 illustrates an example user interface for a metric determination feature, in accordance with at least one embodiment.

FIG. 5 illustrates an example user interface for a metric determination feature, in accordance with at least one embodiment. FIG. 5 depicts user interface 500 presented via web browser 502. In embodiments, the service provider computers implementing the metric determination feature may update or modify a user interface to present information that corresponds to factors or data points that were utilized to determine the updated base metric for an item. For example, user interface 500 includes several features 504-510 for vehicle 512 which include information about item purchases or browsing activity in a website or online retailer. The features 504-510 may include generated data that was utilized by the service provider computers to predict the condition of the vehicle 512 and is indicative of the maintenance and care provided by the user for vehicle 512. In accordance with at least one embodiment, purchase history information and browsing history information may include items or services as illustrated in FIG. 5 with windshield wipers included in 504 and headlight service included at 506.

In embodiments, each feature 504-510 may include information detailing the specific purchase or browsing in the website or online retailer and a time period associated with the activity website or online retailer. The features 504-510 may also include hyperlinks that when interacted with by a user via user interface 500, update the user interface 500 to provide more information about the specific item or service, perhaps for repurchase. The information associated with the features 504-510 can aid a user in understanding how certain data was relatively weighted and ultimately utilized to arrive at the updated base metric for an item such as vehicle 512. As described herein, the purchase history information and the browsing history information utilized by the service provider computers to generate an updated base metric for an item can include items and item categories that are not normally associated with each other. For example, pet hair protective seat covers 508 are not directly associated with a vehicle as they could be utilized in a home as well. The filtering of items and item categories is performed by the service provider computer implementing a machine learning algorithm that is trained to include or not include certain purchase history information and browsing history information when determining a metric that will generate the updated base metric. As identified in illustrated feature 506 the service provider computers may utilize maintenance guidelines for item replacement or service to determine the condition or care for an item provided by a user based on their purchase history information and browsing history information. In embodiments, the user interface 500 may include a data object or interactable object 514 that a user may interact with to provide their current geographic location or otherwise give permission to the service provider computers to obtain their geographic location. The geographic location of the user or the item, the vehicle of FIG. 5, may be used to update the metric for the item. For example, if the geographic location information indicates that a user lives in a coastal area, a car that is exposed to salt water may be depreacate faster in condition and value than a non-coastally exposed car.

Figure 6:
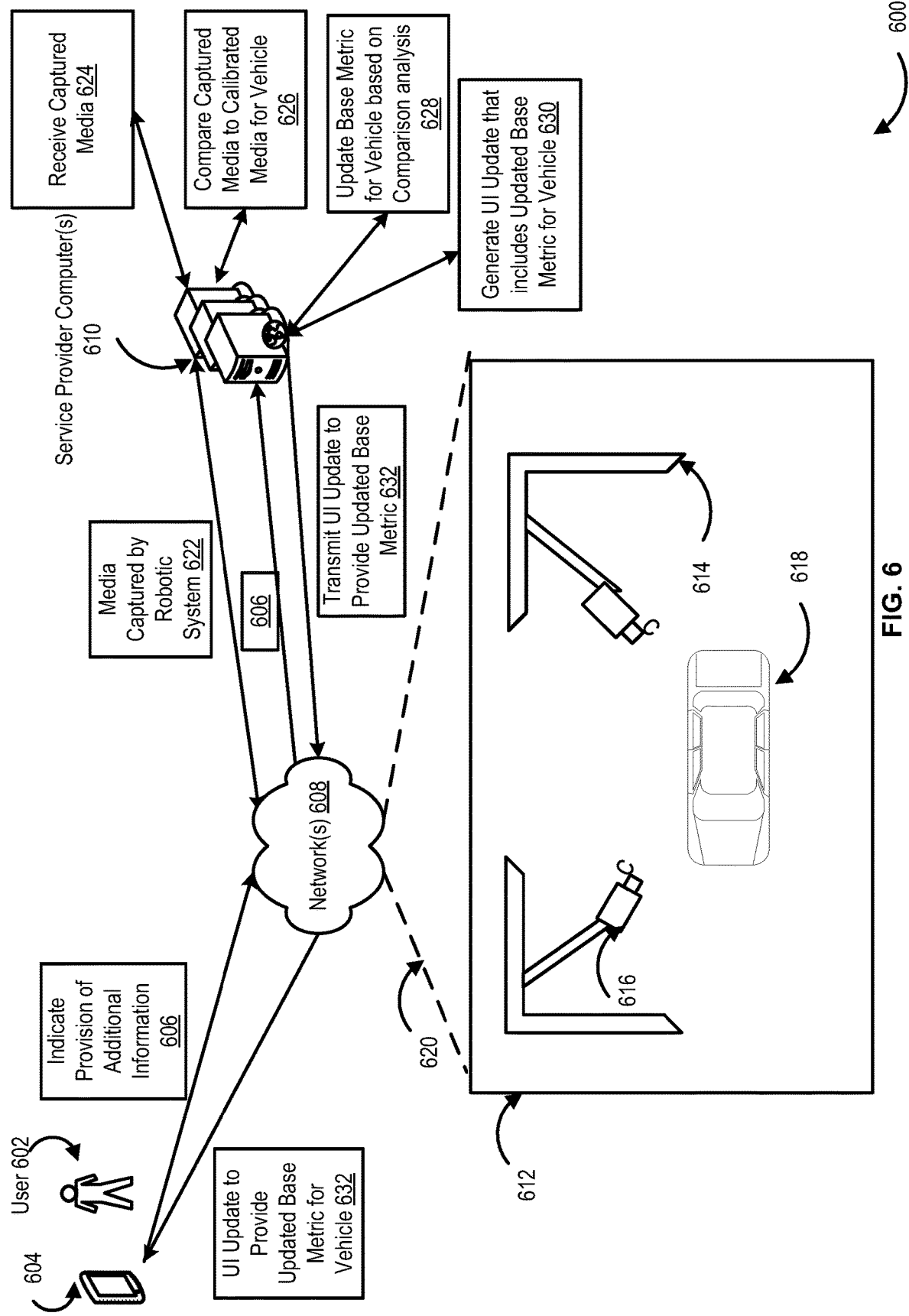
FIG. 6 illustrates an example workflow for a metric determination feature, in accordance with at least one embodiment.

FIG. 6 illustrates an example workflow for a metric determination feature, in accordance with at least one embodiment. FIG. 6 depicts workflow 600 for modifying an updated base metric based on additional information provided to the service provider computers by a robotic system with media capturing capabilities via robotic members. The workflow 600 of FIG. 6 depicts a user 602 utilizing a user device 604 providing an indication of providing additional information 606, via networks 608, to service provider computers 610. As described herein, users can provide additional information to the service provider computers implementing the metric determination feature to further modify the updated base metric for an item. For example, users can capture images or video of the item associated with the request for the metric determination and provide the images or video, via a user device, to the service provider computers for further analysis and modification of the updated base metric.

In embodiments, the indication of providing additional information may be of proximity of their item to a robotic system for capturing media of the item as illustrated in FIG.

6. The workflow 600 of FIG. 6 depicts a robotic system 612 that includes one or more robotic members 614 with one or more media capturing devices 616. The one or more media capturing devices 616 may include cameras or video cameras for capturing images or video of an item such as vehicle 618. In embodiments, the robotic system 612 may be configured to utilize the one or more robotic members 614 to move within a space of the robotic system 612 and around the item (e.g., vehicle 618) to capture images or video of the vehicle 618 at certain angles or of certain portions (e.g., the engine, undercarriage, etc.). The workflow 600 depicts the robotic system 612 transmitting 620 (dashed lines), via networks 608, the captured media 622 to the service provider computers 610.

The workflow 600 includes the service provider computers 610 receiving the captured media at 624 and comparing the captured media to calibrated media for at 626 for vehicle 618. In accordance with at least one embodiment, the service provider computers 610 may be configured to transmit instructions to the robotic system 612 for capturing certain angles and portions of vehicle 618 upon receiving the indication of providing additional information 606 or upon receiving an indication that the item is within a certain proximity of the robotic system 612. The instructions may be tailored to a type of item and therefore different items may include different instructions for capturing certain angles or portions of the item for analysis by the service provider computers 610. The workflow 600 includes the service provider computers 610 updating the base metric for the vehicle (modifying the updated base metric) based on the comparison analysis at 628 of the received captured media 624 and calibrated media or other suitable media of an item such as vehicle 618.

In accordance with at least one embodiment, the service provider computers 610 may be configured to utilize an image recognition algorithm or image comparison algorithm to identify well maintained and cared for items, flaws or defects in an item, or other suitable artifacts of an item which may affect the overall condition or value of the item. The workflow 600 includes the service provider computers 610 generating a user interface update that includes the updated base metric (modified updated base metric) 630 for the vehicle 618 based on the comparison analysis 628. In embodiments, the service provider computers 610 may transmit a user interface update to present the updated base metric at 632 via networks 608, to user device 604 for presentation to user 602. In embodiments, a user interface may be presented to the user 602 via user device 604 which includes a representation of the item associated with the request for a metric determination, such as vehicle 618, adjacent or proximal to an updated base metric or modified updated base metric which reflects the predicted condition or value of the item given the information analyzed by the service provider computers. In embodiments, the user 602 may utilize the updated base metric or the modified updated base metric as a guideline when offering the same item for sale, transfer, or bartering for other items.

Figure 7:
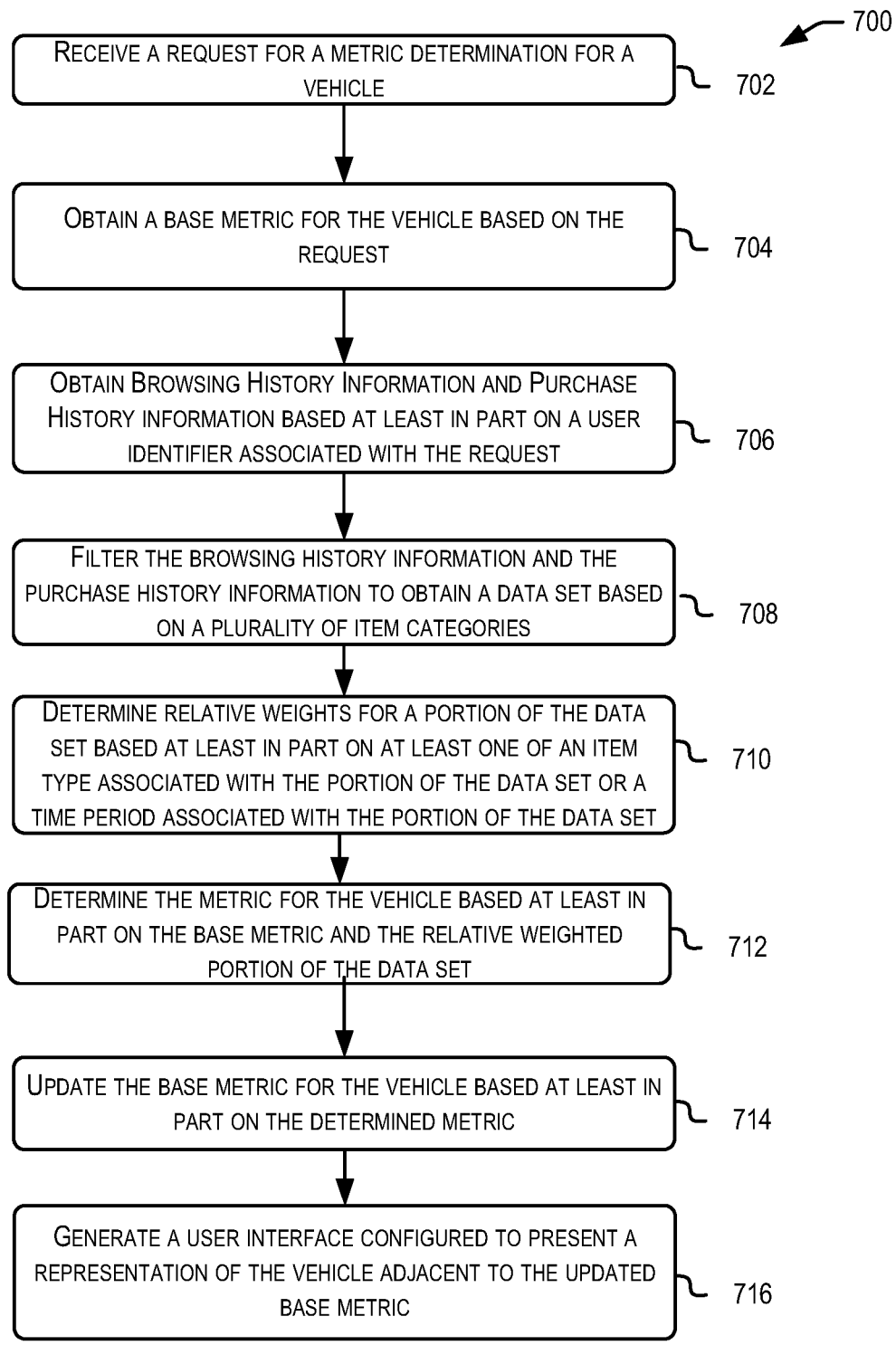
FIG. 7 illustrates an example flow chart for a metric determination feature, in accordance with at least one embodiment.
Figure 8:
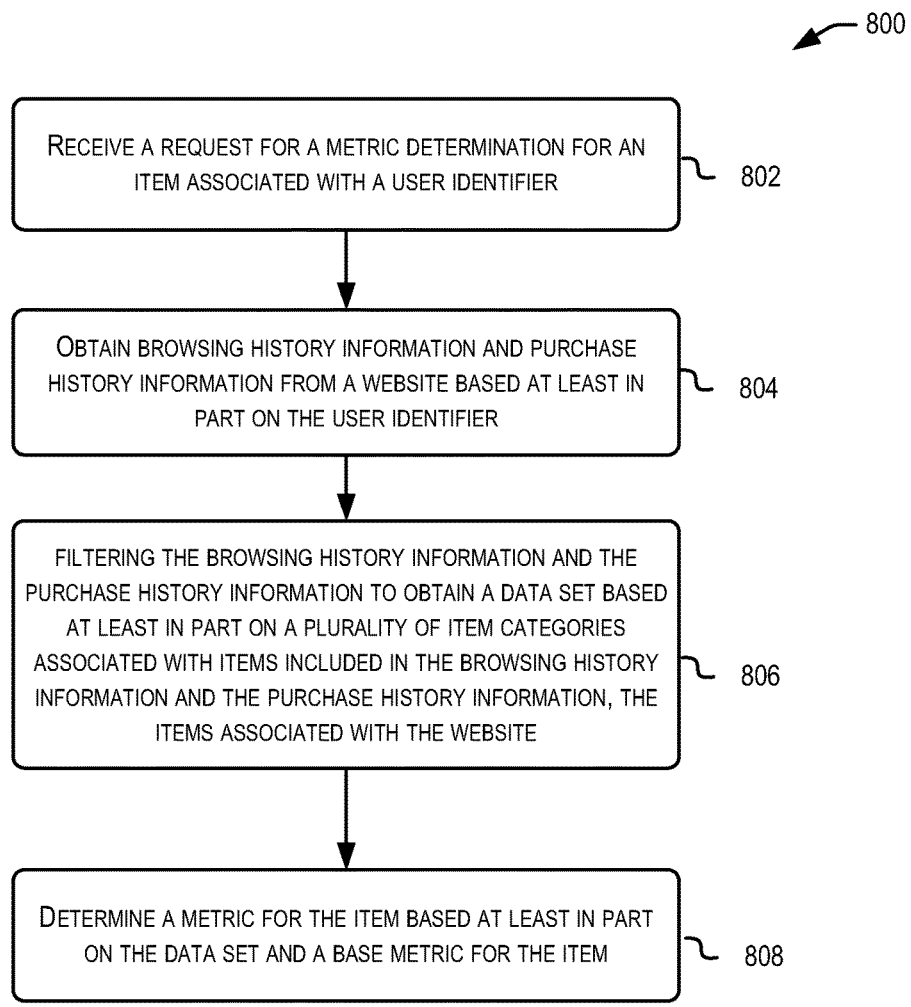
FIG. 8 an example flow chart for a metric determination feature, in accordance with at least one embodiment.

FIGS. 7 and 8 illustrate example flow charts for metric determination features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 9:
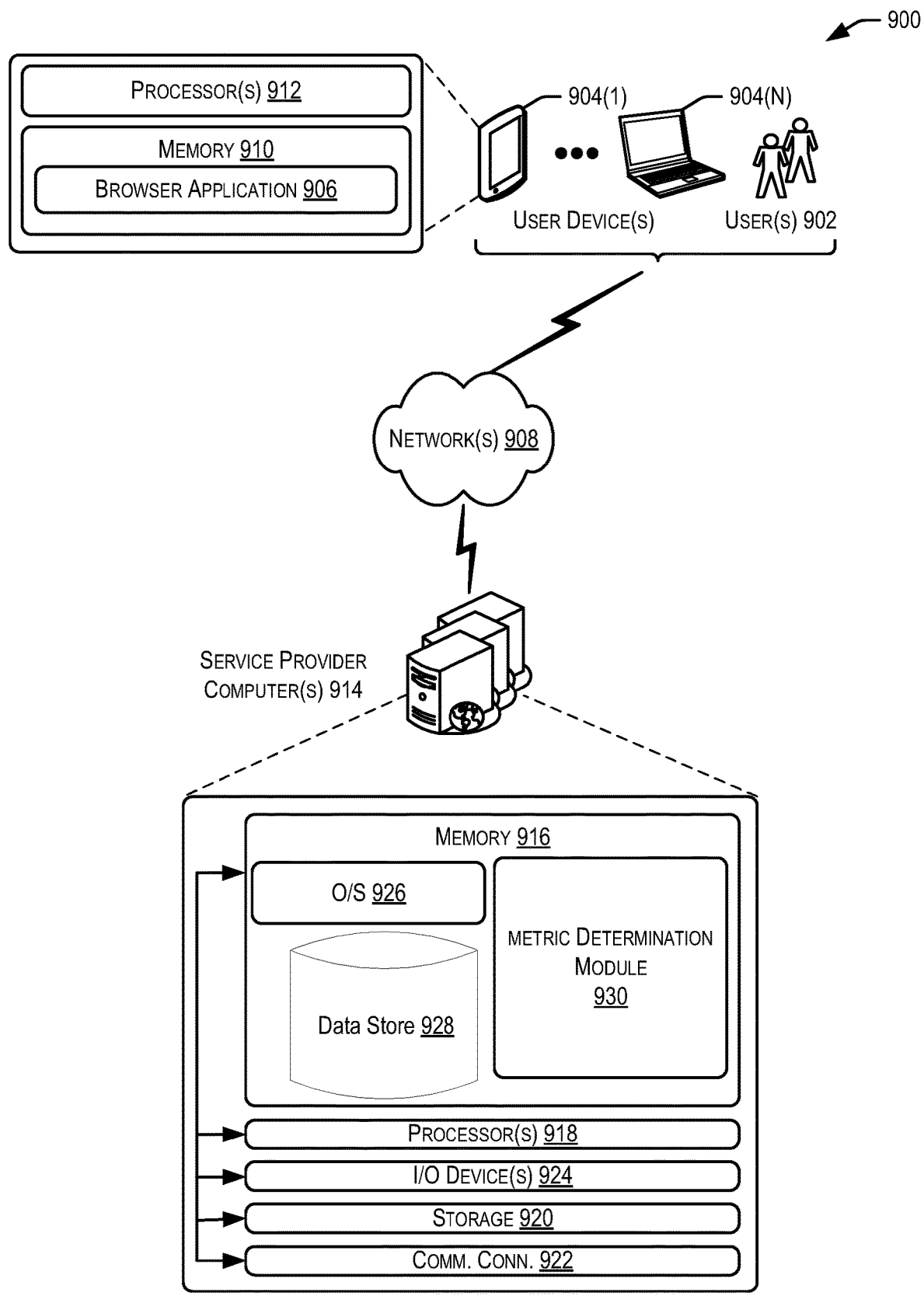
FIG. 9 illustrates an example architecture for implementing a metric determination feature, in accordance with at least one embodiment.

In some examples, service provider computers (service provider computers 914) utilizing at least the metric determination module 930 depicted in FIG. 9 may perform the processes 700 and 800 of FIGS. 7 and 8. In FIG. 7, the process 700 may include receiving a request for a metric determination for a vehicle at 702. In embodiments, the request for the metric determination may include a user identifier, a user name, a device identifier, or other information which may be utilized to obtain or identify purchase history information and browsing history information based on interactions by the user with a website or online retailer. The request for the metric determination may include information about the item itself, for example in the case of a vehicle the make, model, and year of the vehicle may be provided. For other items, the model number, purchase date, or warranty information may be provided. The process 700 may include obtaining a base metric for the vehicle based on the request for the metric determination at 704. In accordance with at least one embodiment, the service provider computers implementing the metric determination feature may be configured to determine the base metric for the item based on current listing prices or offering prices for the same item via the associated website or online retailer. In embodiments, the service provider computers may also obtain the base metric from one or more third parties offering the same item.

The process 700 may include obtaining browsing history information and purchase history information based at least in part on a user identifier associated with the request at 706. The process 700 may include filtering the browsing history information and the purchase history information to obtain a data set based at least in part on a plurality of item categories at 708. The item categories of the items included in the browsing history information and the purchase history information may be offered by the website or online retailer. In embodiments, the service provider computers may filter for related items from an item category that is similar to the item category associated with the item that corresponds to the request for the metric determination. The service provider computers may also filter for items from item categories that are not related but have been selected by the machine learning algorithm as important for the particular item category of the item that corresponds to the request for the metric determination. For example, if the item in question is a vehicle, item purchases or browsing of pet care products, children accessories for vehicles, or certain cleaning products could be indicators of the user's care and maintenance for the vehicle.

The process 700 may include determining relative weights for a portion of the data set based at least in part on at least one of an item type associated with the portion of the data set or a time period associated with the portion of the data set at 710. In embodiments, relative weights may be associated with a portion of the data included in the browsing history information and the purchase history information. The relative weights of the data may be used by the machine learning algorithm when determining the metric for the item. Items or services that are browsed or purchased further in the past, from the point of time of the request for the metric determination, may be weighted differently than more recent purchases or browsing of items or services. Different item types or item categories may be weighted differently as well. The process 700 may include determining the metric for the vehicle based at least in part on the base metric and the relative weighted portion of the data set at 712. The process 700 may include updating the base metric for the vehicle based at least in part on the determined metric at 714. The updated base metric may represent a depreciation of the base metric and more accurately represent the condition or value of the item or vehicle given the care and maintenance provided by the user associated with the item or vehicle. The process 700 may include generating a user interface that is configured to present a representation of the vehicle adjacent to the updated base metric at 716.

The process 800 may include receive a request for a metric determination for an item associated with a user identifier at 802. The process 800 may include obtaining browsing history information and purchase history information from a website based at least in part on the user identifier at 804. In embodiments, the service provider computers implementing the metric determination feature may determine a geographical area associated with the user identifier which can be used to update the base metric for the item. The process 800 may include filtering the browsing history information and the purchase history information to obtain a data set based at least in part on a plurality of item categories associated with items included in the browsing history information and the purchase history information at 806. The items may be associated or offered by the website. The item categories of the items filtered and selected for further analysis may be based on the item type or item category of the item associated with the request for the metric determination. The process 800 may include determining a metric for the item based at least in part on the data set and a base metric for the item at 808. The metric may represent an updated base metric that reflects the predicted value or condition of the item as depreciated from a brand new state.

FIG. 9 illustrates an example architecture for implementing a metric determination feature, in accordance with at least one embodiment. In architecture 900, one or more users 902 (e.g., customers, users, consumers, etc.) may utilize user computing devices 904(1)-(N) (collectively, user devices 904) to access a browser application 906 or a user interface (UI) accessible through the browser application 906, via one or more networks 908 to request a metric determination for an item such as a vehicle. The "browser application" 906 can be any browser control or native application that can access and display a network page or other information such as a user interface of a native software application for enabling the provision of additional information such as providing captured media of an item or a representation of an item along with other information such as text, images, or video. A native software application may include an application or program that has been developed for use on a particular platform (such as an operating system) or a particular device (such as a particular type of mobile device or user device 904). In embodiments, the user device 904 may include one or more components for enabling the user 902 to interact with the browser application 906.

The user devices 904 may include at least one memory 910 and one or more processing units or processor(s) 912. The memory 910 may store program instructions that are loadable and executable on the processor(s) 912, as well as data generated during the execution of these programs. Depending on the configuration and type of the user devices 904, the memory 910 may be volatile (such as random access memory (RAM)) and/or non-volatile (such as read-only memory (ROM), flash memory, etc.). The user devices 904 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 904. In some implementations, the memory 910 may include multiple different types of memory, such as static random access memory (SRAM), dynamic random access memory (DRAM), or ROM.

Turning to the contents of the memory 910 in more detail, the memory 910 may include an operating system and one or more application programs or services for implementing the features disclosed herein. Additionally, the memory 910 may include one or more modules for implementing the features described herein including the metric determination module 930.

The architecture 900 may also include one or more service provider computers 914 that may, in some examples, provide computing resources such as, but not limited to, client entities, low latency data storage, durable data store, data access, management, virtualization, hosted computing environment or "cloud-based" solutions, electronic content performance management, etc. The service provider computers 914 may implement or be an example of the service provider computer(s) described herein with reference to FIGS. 1-8 and throughout the disclosure. The one or more service provider computers 914 may also be operable to provide site hosting, computer application development, and/or implementation platforms, combinations of the foregoing, or the like to the one or more users 902 via user devices 904.

In some examples, the networks 908 may include any one or a combination of many different types of networks, such as cable networks, the Internet, wireless networks, cellular networks, and other private and/or public networks. While the illustrated examples represents the users 902 communicating with the service provider computers 914 over the networks 908, the described techniques may equally apply in instances where the users 902 interact with the one or more service provider computers 914 via the one or more user devices 904 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.). One or more third party computers or entities (not pictured) may transmit information to and receive information from the service provider computers via networks 908.

The one or more service provider computers 914 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 914 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 914 may be in communication with the user device 904 via the networks 908, or via other network connections. The one or more service provider computers 914 may include one or more servers, perhaps arranged in a cluster or as individual servers not associated with one another.

In one illustrative configuration, the one or more service provider computers 914 may include at least one memory 916 and one or more processing units or processor(s) 918. The processor(s) 918 may be implemented as appropriate in hardware, computer-executable instructions, firmware, or combination thereof. Computer-executable instruction or firmware implementations of the processor(s) 918 may include computer-executable or machine-executable instructions written in any suitable programming language to perform the various functions described when executed by a hardware computing device, such as a processor. The memory 916 may store program instructions that are loadable and executable on the processor(s) 918, as well as data generated during the execution of these programs. Depending on the configuration and type of the one or more service provider computers 914, the memory 916 may be volatile (such as RAM) and/or non-volatile (such as ROM, flash memory, etc.). The one or more service provider computers 914 or servers may also include additional storage 920, which may include removable storage and/or non-removable storage. The additional storage 920 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 916 may include multiple different types of memory, such as SRAM, DRAM, or ROM.

The memory 916, the additional storage 920, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 916 and the additional storage 920 are all examples of non-transitory computer storage media. Additional types of non-transitory computer storage media that may be present in the one or more service provider computers 914 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 914. Combinations of any of the above should also be included within the scope of non-transitory computer-readable media.

The one or more service provider computers 914 may also contain communication connection interface(s) 922 that allow the one or more service provider computers 914 to communicate with a data store, another computing device or server, user terminals, and/or other devices on the networks 908. The one or more service provider computers 914 may also include I/O device(s) 924, such as a keyboard, a mouse, a pen, a voice input device, a touch input device, a display, speakers, a printer, etc.

Turning to the contents of the memory 916 in more detail, the memory 916 may include an operating system 926, one or more data stores 928, and/or one or more application programs or services for implementing the features disclosed herein including the metric determination module 930. In accordance with at least one embodiment, the metric determination module 930 may be configured to at least utilize information associated with a user and a website, such as online retailer, to update a base metric for an item where the updated base metric represents a condition or value of the item depreciated from the base value. In embodiments, the metric determination module 930 may implement a machine learning algorithm that is configured to utilize purchase history information and browsing history information of a user from the website to update a base metric for an item such as a vehicle which predicts the condition of the item. The algorithm can be utilized by the metric determination module 930 to further update the base metric based on additional data points such as media provided by users 902 via user devices 904 or third parties.

The metric determination module 930 may be configured to identify appropriate items in the purchase history information and browsing history information based on associated item categories, how recent a purchase or browsing of an item or service occurred, and associate a relative weight to the data points included in the browsing and purchase history to update the base metric which reflects the predicted condition or value of the item. In embodiments, the metric determination module 930 may generate and transmit user interface(s), user interface object(s), media such as images or video, or requests for additional information to the user device 904 via networks 908 for further processing such as by updating a metric or base metric as described herein. The metric determination module 930 may implement one or more image recognition algorithms for comparing media received from users, robotic systems (computers), or third parties to calibrated images to modify an updated base metric. For example, the machine learning algorithm implemented by the service provider computers may utilize media provided by users or other entities to modify the updated base metric which reflects the condition or value of an item. In embodiments, the metric determination module 930 may be configured to generate and transmit instructions to user devices 904, third party computers, or robotic systems for capturing media of the item. The instructions may be particular to a type of item such as a type of vehicle and indicate certain angles and portions of the item to be captured via an image or video for proper analysis to calibrated images or video.

Figure 10:
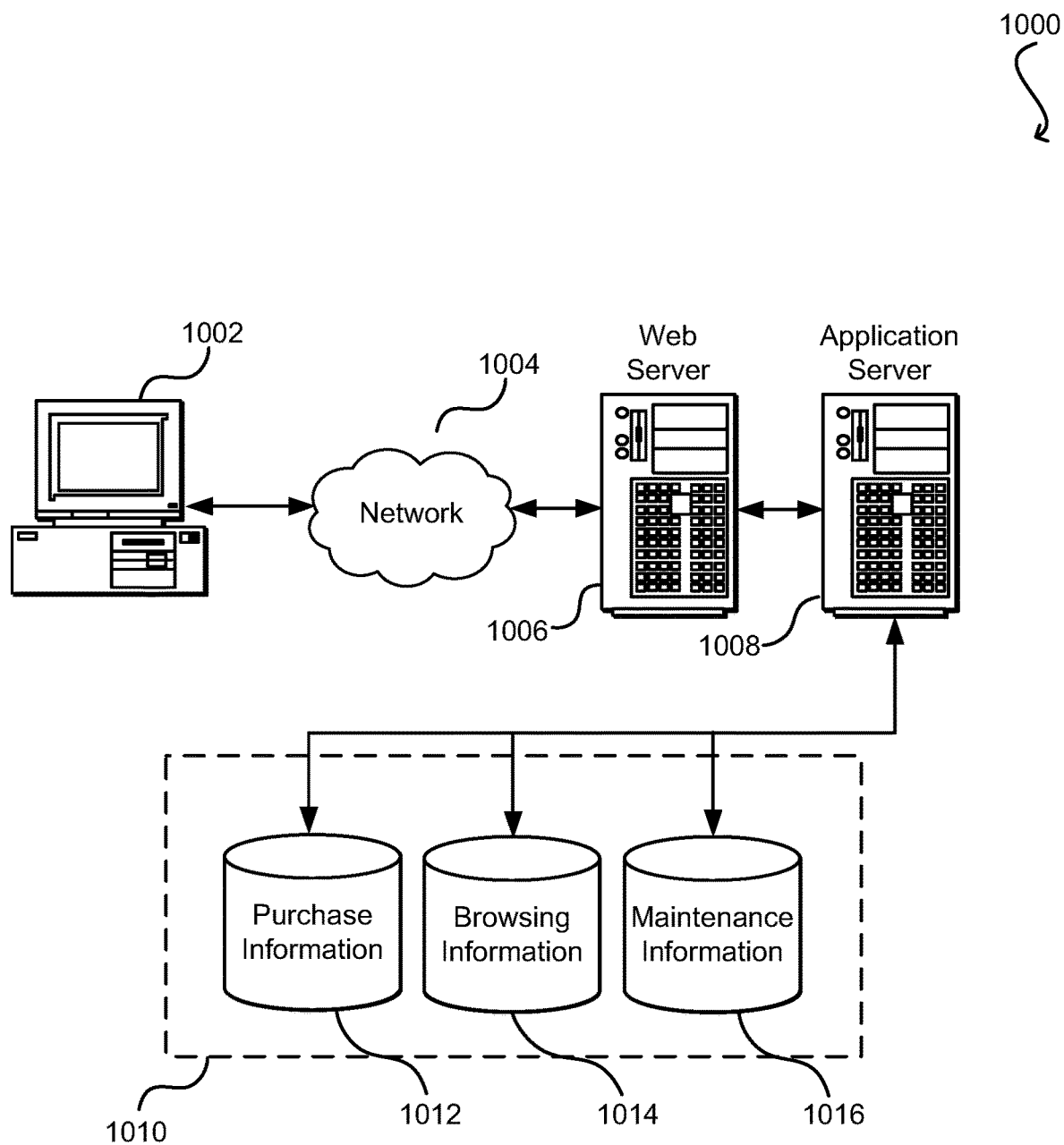
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing purchase information 1012 and maintenance information 1016, which can be used to serve content for the production side as well as determine a metric or update a base metric for an item such as a vehicle. The data store also is shown to include a mechanism for storing browsing information 1014, which can be used for reporting, analysis, or other such purposes such as determining a metric or updating a base metric for an item such as a vehicle. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, a request for a metric determination for a vehicle associated with a user identifier, the request including a make of the vehicle, a model of the vehicle, and year of purchase for the vehicle, wherein a metric corresponding to the metric determination indicates a condition for the vehicle represented as a numerical scale;
   obtaining, by the computer system, a base metric for the vehicle based at least in part on the request, the base metric representing a metric that corresponds to the vehicle in a new state;
   obtaining, by the computer system, browsing history information from a website and purchase history information from the website based at least in part on the user identifier;
   filtering, by the computer system, the browsing history information and the purchase history information to obtain a data set based at least in part on a plurality of item categories associated with items included in the browsing history information and the purchase history information, the items associated with the website;
   determining, by the computer system, relative weights for a portion of the data set based at least in part on maintenance thresholds associated with the items in the browsing history information and the purchase history information and at least one of an item type associated with the portion of the data set or a time period associated with the portion of the data set;
   generating, by the computer system, an updated base metric for the vehicle by depreciating the base metric for the vehicle based at least in part on the portion of the data set and the relative weights determined for the portion of the data set;
   generating, by the computer system, a user interface configured to present a representation of the vehicle adjacent to the updated base metric for the vehicle;
   generating, by the computer system, instructions for moving one or more robotic members with cameras within a volume of space of a robotic system to capture one or more images of the vehicle in response to receiving an indication from a user device about proximity of the vehicle to the robotic system, the user device associated with the user identifier, the instructions also identifying certain portions of the vehicle and certain angles of the vehicle to be captured by the one or more robotic members while moving within the volume of space;
   transmitting, by the computer system, the instructions to the robotic system and the one or more robotic members;
   receiving, by the computer system, and from the robotic system, the one or more images;
   comparing, by the computer system, the one or more images to calibrated images of the vehicle; and
   modifying, by the computer system, the updated base metric based at least in part on the comparison of the one or more images to the calibrated images of the vehicle.

2. The computer-implemented method of claim 1, wherein the calibrated images are of another vehicle, the another vehicle being a same type as the vehicle.

3. The computer-implemented method of claim 1, wherein the browsing history information and the purchase history information includes maintenance services for the vehicle or part replacement services for the vehicle.

4. A non-transitory computer-readable storage medium storing computer-executable instructions that, when executed by a computer system, configure the computer system to perform operations comprising:
   receiving a request for a metric determination for an item associated with a user identifier, a metric corresponding to the metric determination for the item indicating a condition of the item represented as a numerical scale;
   obtaining a base metric for the item based at least in part on the request, the base metric representing the metric for the item that corresponds to the item in a new state;
   obtaining browsing history information from a web site and purchase history information from the website based at least in part on the user identifier;
   filtering the browsing history information and the purchase history information to obtain a data set based at least in part on a plurality of item categories associated with items included in the browsing history information and the purchase history information, the items associated with the website;
   determining relative weights for a portion of the data set based at least in part on maintenance thresholds associated with the items in the browsing history information and the purchase history information and at least one of an item type associated with the portion of the data set or a time period associated with the portion of the data set;
   generating an updated base metric for the item by depreciating the base metric for the item based at least in part on the portion of the data set and the relative weights determined for the portion of the data set;
   generating a user interface configured to present a representation of the item adjacent to the updated base metric for the item;
   generating instructions for moving one or more robotic members with cameras within a volume of space of a robot system to capture one or more images of the item in response to receiving an indication from a user device about proximity of the item to the robotic system, the user device associated with the user identifier, the instructions also identifying certain portions of the item and certain angles of the item to be captured by the one or more robotic members while moving within the volume of space;
   transmitting the instructions to the robotic system and the one or more robotic members;
   receiving, from the robotic system, the one or more images;

comparing the one or more images to calibrated images of the item; and modifying the updated base metric based at least in part on the comparison of the one or more images to the calibrated images of the item.

5. The non-transitory computer-readable storage medium of claim 4, wherein the computer-executable instructions, when executed by the computer system further configure the computer system to perform operations comprising:

transmitting the modified base metric to a user device associated with the user identifier.

6. The non-transitory computer-readable storage medium of claim 4, wherein the computer-executable instructions, when executed by the computer system further configure the computer system to perform operations comprising:

receiving third party information from a third party indicating a condition of the item; and modifying the updated base metric for the item further based at least in part on the third party information.

7. The non-transitory computer-readable storage medium of claim 4, wherein the computer-executable instructions, when executed by the computer system further configure the computer system to perform operations comprising receiving an evaluation metric for another item from a third party, the another item being a same type of item as the item.

8. The non-transitory computer-readable storage medium of claim 7, wherein the computer-executable instructions, when executed by the computer system further configure the computer system to perform operations comprising modifying the updated base metric for the item further based at least in part on the evaluation metric and a threshold.

9. The non-transitory computer-readable storage medium of claim 4, wherein the computer-executable instructions, when executed by the computer system further configure the computer system to perform operations comprising:

receiving evaluation information for the item from an evaluation entity; and modifying the updated base metric for the item further based at least in part on the evaluation information.

10. The non-transitory computer-readable storage medium of claim 4, wherein the computer-executable instructions, when executed by the computer system further configure the computer system to perform operations comprising:

receiving, via a user device, evaluation information for the item, the user device associated with the user identifier; and modifying the updated base metric for the item further based at least in part on the evaluation information.

11. The non-transitory computer-readable storage medium of claim 4, wherein the computer-executable instructions, when executed by the computer system further configure the computer system to perform operations comprising receiving feedback information indicating a difference between the base metric for the item and a transfer metric utilized when transferring the item to another entity.

12. The non-transitory computer-readable storage medium of claim 11, wherein the computer-executable instructions, when executed by the computer system further configure the computer system to perform operations comprising updating an algorithm based at least in part on the feedback information, the algorithm configured to modify the updated base metric for the item by utilizing the feedback information, the data set, and the base metric.

13. A computer system comprising:

a memory configured to store computer-executable instructions; and a processor in communication with the memory configured to execute the computer-executable instructions to at least:

receive a request for a metric determination for an item, the request including a user identifier, a metric corresponding to the metric determination for the item indicating a condition of the item represented as a numerical scale;

obtain a base metric for the item based at least in part on the request, the base metric representing the metric for the item that corresponds to the item in a new state;

obtain browsing history information from a website and purchase history information from the website based at least in part on the user identifier;

filter the browsing history information and the purchase history information to obtain a data set based at least in part on a plurality of item categories associated with items included in the browsing history information and the purchase history information, the items associated with the website;

determine relative weights for a portion of the data set based at least in part on maintenance thresholds associated with the items in the browsing history information and the purchase history information and at least one of an item type associated with the portion of the data set or a time period associated with the portion of the data set;

generate an updated base metric for the item by depreciating the base metric for the item based at least in part on the portion of the data set and the relative weights determined for the portion of the data set;

generate a user interface configured to present a representation of the item adjacent to the updated base metric for the item;

generate instructions for moving one or more robotic members with cameras within a volume of space of a robot system to capture one or more images of the item in response to receiving an indication from a user device about proximity of the item to the robotic system, the user device associated with the user identifier, the instructions also identifying certain portions of the item and certain angles of the item to be captured by the one or more robotic members while moving within the volume of space;

transmit the instructions to the robotic system and the one or more robotic members;

receive, from the robotic system, the one or more images;

compare the one or more images to calibrated images of the item; and modify the updated base metric based at least in part on the comparison of the one or more images to the calibrated images of the item.

14. The computer system of claim 13, wherein the processor is further configured to execute the computer-executable instructions to at least determine a geographic area associated with the user identifier based at least in part on the browsing history information and the purchase history information.

15. The computer system of claim 14, wherein the processor is further configured to execute the computer-executable instructions to at least modify the updated base metric for the item further based at least in part on the geographic area associated with the user identifier.

16. The computer system of claim 13, wherein the processor is further configured to execute the computer-executable instructions to at least generate a modification value that indicates a particular range of the updated base metric for the item based at least in part on information from a third party.

* * * * *